(12) United States Patent
Lane et al.

(10) Patent No.: US 8,718,201 B2
(45) Date of Patent: May 6, 2014

(54) CONTROL CHANNEL DEMODULATING AND DECODING METHOD AND COMMUNICATION APPARATUS USING THE SAME

(75) Inventors: Richard A. Lane, Cambridge (GB); Mark B. Murphy, Cambride (GB); Cyril Valadon, Herts (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 32 days.

(21) Appl. No.: 13/525,768

(22) Filed: Jun. 18, 2012

(65) Prior Publication Data

US 2013/0294547 A1 Nov. 7, 2013

(30) Foreign Application Priority Data

May 7, 2012 (EP) ..................................... 12166952

(51) Int. Cl.
*H04L 27/08* (2006.01)
(52) U.S. Cl.
USPC ........... 375/340; 375/232; 375/239; 375/242; 375/256; 375/257; 375/286; 375/253
(58) Field of Classification Search
CPC ..... H04L 5/0023; H04L 5/007; H04L 5/0053; H04L 5/0051; H04L 5/0048; H04L 5/005; H04L 2025/03426; H04L 5/006; H04L 5/0092; H04L 27/261; H04L 27/2646; H04L 27/2655; H04L 1/0045; H04I 1/0045; H04I 5/0016; H04W 72/042; H04W 56/00; H04W 56/0035; H04B 7/024; H04B 7/0413; H04B 7/0639; H04B 7/0417; H04B 7/0452; H04B 7/068; H04B 7/0684
USPC ......... 375/260, 262, 265, 267, 340, 343, 346; 370/203, 204, 205, 206, 207, 208, 209, 370/210

See application file for complete search history.

(56) References Cited

U.S. PATENT DOCUMENTS

| | | | |
|---|---|---|---|
| 8,351,974 B2 * | 1/2013 | Ahn et al. | 455/522 |
| 8,385,268 B2 * | 2/2013 | Chen et al. | 370/328 |
| 2011/0076962 A1 * | 3/2011 | Chen et al. | 455/68 |

* cited by examiner

*Primary Examiner* — Dhaval Patel
(74) *Attorney, Agent, or Firm* — Edell, Shapiro & Finnan, LLC (57) ABSTRACT

Techniques are provided for a demodulation and decoding method and apparatus for a given user equipment device to receive a one or more Orthogonal Frequency Division Multiplex (OFDM) symbols over a control channel, where the OFDM symbols comprise a plurality of resource element groups distributed in time and frequency that are combined to form control channel elements. Those resource element groups that form specific control channel elements for the user equipment device and those resource element groups that form common control channel elements for one or more user equipment devices including the given user equipment device are identified. The resource element groups that form the specific control channel elements and the resource element groups that form the common control channel elements are demodulated to generate encoded control messages comprising one or more control channel elements.

20 Claims, 9 Drawing Sheets

CONTROL CHANNEL DEMODULATING AND DECODING METHOD AND COMMUNICATION APPARATUS USING THE SAME

FIELD OF THE INVENTION

The present disclosure relates to wireless communication devices and more particularly to techniques aimed at both reducing demodulation and decoding complexity and improving detection performance of control channels in wireless communication devices.

BACKGROUND OF THE INVENTION

The $3^{rd}$ Generation Partnership Project (3GPP) developed the standards used by Long Term Evolution (LTE) cellular communication systems. LTE is a standard for wireless data communications technology that has evolved from the GSM/UMTS standards. The goal of LTE is to increase the capacity and speed of wireless data networks using new Digital Signal Processing (DSP) techniques and modulation schemes that were developed in the past decade. The LTE wireless interface is incompatible with second generation (2G) and third generation (3G) networks, and operates via a separate wireless spectrum.

To provide control information from the base station to the mobile subscriber's user equipment (UE), e.g., a mobile phone, LTE uses downlink physical control channels. The physical control channels comprise a physical broadcast channel (PBCH) and a physical downlink control channel (PDCCH) that both serve a variety of purposes. The PBCH provides network configuration information to the UEs such as transmitted signal bandwidth and System Frame Number (SFN). The PDCCH is primarily used to convey the scheduling decisions to individual UEs, i.e., scheduling assignments for uplink and downlink transmissions.

The control information for PDCCHs is encoded in a control region comprising a number of Orthogonal Frequency Division Multiplex (OFDM) symbols varying from one up to four that are located at the start of each subframe. Both the PBCH and PDCCH use a tail-biting convolutional code to encode information for the UE. Multiple PDCCH messages can be transmitted by the base-station in the control region and these different messages will typically be addressed to different UEs. Moreover, a number of different possible formats for these messages can be used for the eNode-B transmission. As the base-station does not explicitly signal the location of these messages in the control region nor their formats, the UEs need to blindly detect the presence of relevant control information and decode this information according to the identified format. The blind detection and decoding process that needs to be performed by the UE increases the computational complexity and can also lead to an increase in the false detection of control messages. The invention described therein provides techniques which reduce the processing complexity and improve the accuracy of the blind detection and decoding.

SUMMARY OF THE INVENTION

Techniques are provided herein, for a demodulation and decoding method and apparatus, such that a given UE device receives one or more of Orthogonal Frequency Division Multiplex (OFDM) symbols over a control region, where the OFDM symbols comprise a plurality of resource element groups distributed in time and frequency and that are combined to form control channel elements. For each UE, multiple groupings of control channel elements are defined in order to generate search spaces identifying the control channel elements which may contain control information messages to be detected and decoded by the UE.

Techniques are provided for calculating for each resource element group an index to a corresponding control channel element (CCE) based on an indexing scheme employed by a base station that is configured to transmit the one or more of OFDM symbols and identifying whether or not the index corresponds to one of the search spaces defined at the UE. Those resource element groups that are not identified are discarded prior to demodulation. Resource elements groups belonging to at least one of the defined search spaces are demodulated and the demodulated samples are copied to the input buffer(s) associated with the identified search space(s).

Each search space defines a number of candidate CCE sets which the UE needs to test. For each candidate CCE set in a given search space, the UE may need to test for multiple control message sizes as well as multiple message types where the message type defines the mapping of the message bits to control information fields. According to one aspect of the invention, Viterbi decoding is performed for each candidate CCE set and each possible control information message size. The decoded sequences generated by the Viterbi decoding, also referred to as candidate codewords, are then checked against a set of Cyclic Redundancy Check (CRC) conditions where the different conditions use a mask specific to each message type that needs to be tested.

According to one further aspect of the invention, the UE provides a separate output buffer for each message type in order to store the valid codewords which have satisfied the corresponding CRC condition. For each message type, the output buffer is sized so as to provide storage for a number of codewords at least equal to the maximum number of messages of the associated type which can be received in a single subframe.

According to one further aspect of the invention, the valid codewords are organized in each output buffer following an order defined according to the search spaces from which the different codewords were generated. In an alternative embodiment, a quality metric is calculated for each candidate codeword during the Viterbi and CRC processing stages and the valid codewords for a given message type are organized in the output buffer based on the values taken by these quality metrics.

In some conditions, it is possible for the same control information message to be detected by the UE in multiple search spaces. According to one embodiment of the invention, the storing of multiple identical codewords in the relevant output buffer is prevented by detecting conditions where such an occurrence could happen and comparing the contents of valid codewords against already stored codewords.

The ultimate problem to solve is the identification of one or more messages in a set of candidate spaces defined by resources which are shared between different users. Because the resources are shared between different users and multiple candidates need to be considered, the decoding should be performed in a way which minimizes the false alarm probability. The decoding should also be performed in an efficient manner in order to minimize the complexity associated with the large number of candidates which need to be considered.

DESCRIPTION OF EXAMPLE EMBODIMENTS

Figure 1:
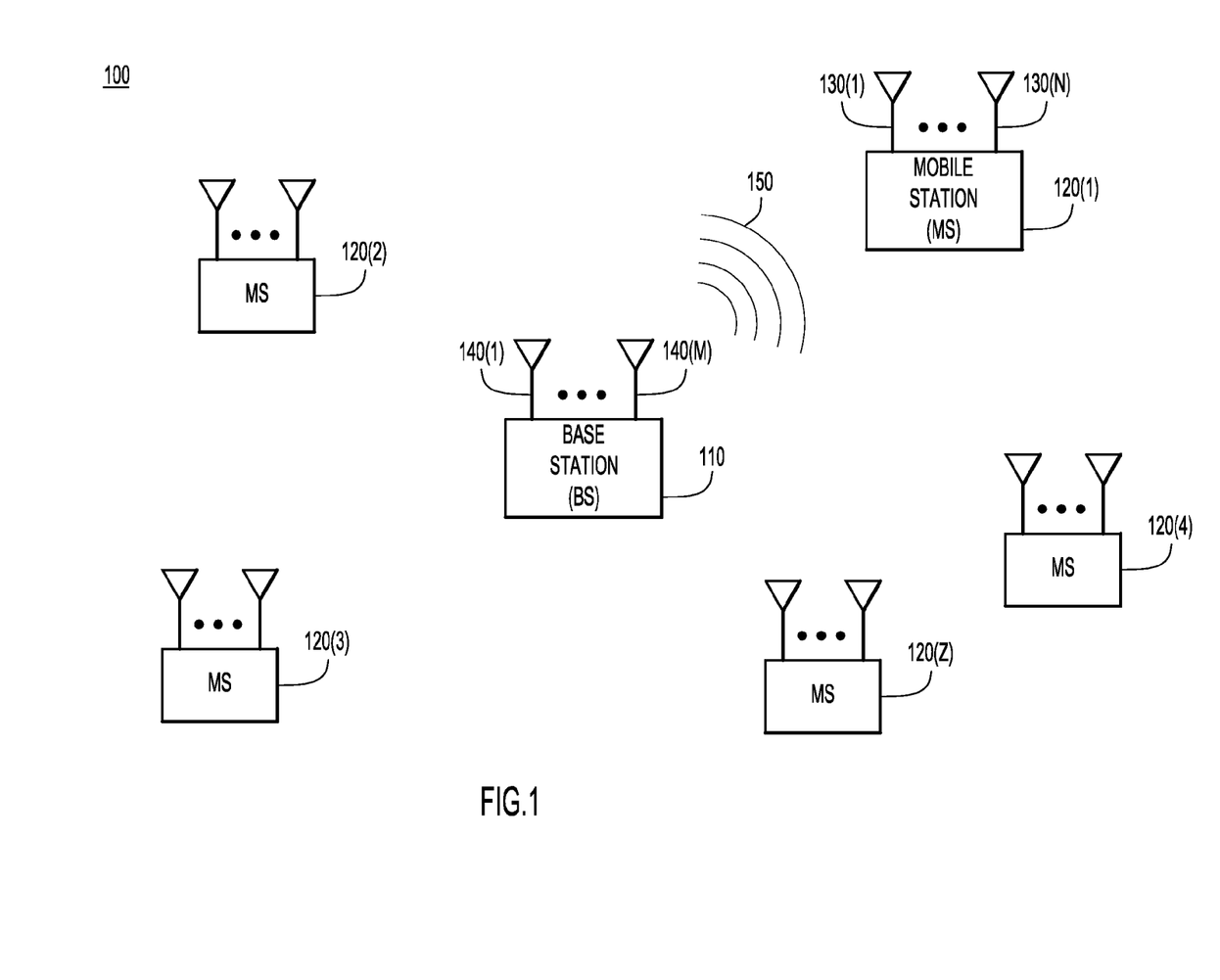
FIG. 1 is an example of a block diagram of a wireless communication system in which a base station (BS) communicates with mobile stations (MSs), also referred to herein as UEs, in which each mobile station employs a selective channel control element (CCE) demodulation process according to the techniques described herein.

Referring first to FIG. 1, a wireless radio communication system or network is shown generally at reference numeral 100 and comprises a base station (BS) 110, or eNode B in LTE parlance, and a plurality of UEs or mobile stations (MSs) 120(1)-120(Z). The BS 110 may connect to other wired data network facilities (not shown) and in that sense serves as a gateway or access point through which the MSs 120(1)-120(Z) have access to those data network facilities.

The BS 110 comprises a plurality of antennas 140(1)-140(M) and the MSs 120(1)-120(Z) may also comprise a plurality of antennas 130(1)-130(N). The BS 110 may wirelessly communicate with individual ones of the MSs 120(1)-120(Z) using a wideband wireless communication protocol in which the bandwidth is much larger than the coherent frequency bandwidth, e.g., using LTE.

In this example, the BS 100 transmits downlink control messages 150, e.g., using PDCCHs. The downlink control messages are also referred to as Downlink Control Information (DCI). The techniques provided herein enable the MSs on a wireless communication link to demodulate and decode messages received from the BS using a selective CCE demodulation process. For example, as depicted in FIG. 1, the BS 110 transmits a message 150 to a particular MS, e.g., MS 120(1). The MS 120(1) demodulates and decodes the message based on the signals it receives from the BS using the techniques described herein. The MS 120(1) may then transmit a response back to the BS 110.

Figure 2A:
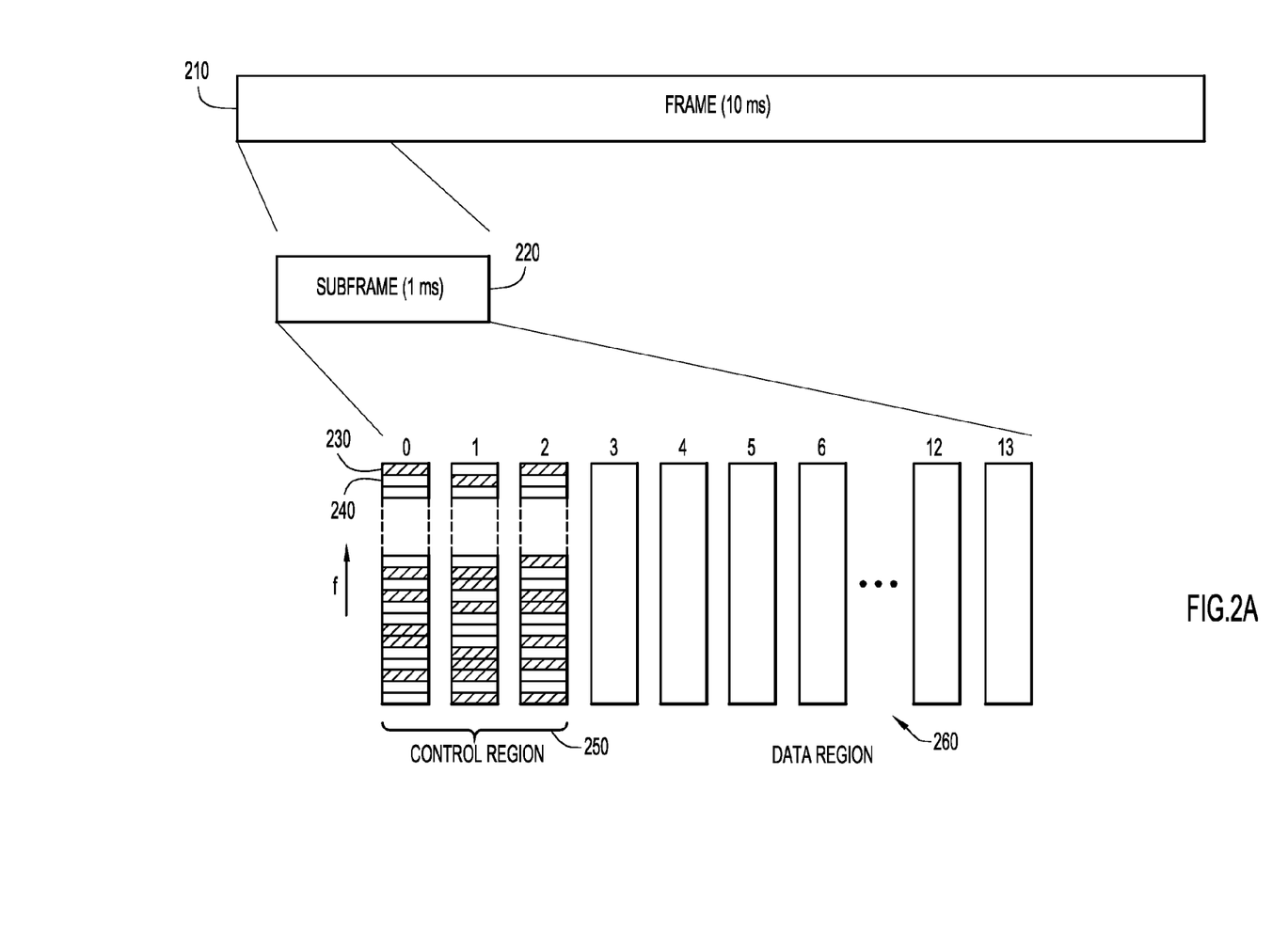
FIG. 2A is an example block diagram of an LTE downlink frame structure with selected resource element groups that form CCEs for a specific UE according to the techniques described herein.

Referring to FIG. 2A, components of an LTE transmission frame are shown. FIG. 2A shows an LTE frame 210 that is 10 milliseconds (ms) in duration. The frame 210 comprises 10 subframes that are 1 ms in duration, of which subframe 220 is shown. Subframe 220 comprises either 12 or 14 OFDM symbols that are, for example, part of an Orthogonal Frequency Division Multiple Access (OFDMA) transmission scheme. OFDMA divides the allocated radio frequency (RF) spectrum into a number of orthogonal subcarriers. In this example, 14 symbols numbered zero to 13 are shown with radio frequency (RF) f for individual subcarriers increasing from the bottom of the symbols toward the top of the symbols. A resource element (RE) occupies a single subcarrier over one OFDM symbol. The symbols are divided into a control region 250 and a data region 260. The control region 250 may comprise the first one to four symbols, while the remainder of the symbols comprise the data region 260. In this example, the control region 250 comprises the first three symbols, numbered 0, 1, and 2.

The symbols in the control region 250 are made up of a number of resource element groups (REGs) delineated by horizontal lines. REGs that are targeted for a single specific UE, referred to herein as a "target" UE, are REGs depicted with hashing, while REGs not intended for the target UE are not hashed. For example, REG 230 is for the target UE and REG 240 may be for a different UE. As defined in the LTE specifications, a REG is made up of four resource elements. In turn, nine REGs make up a CCE. When multiplied out, one CCE comprises information carried on 36 resource elements. The target REGs are shown dispersed throughout the symbol space using an interleaving mechanism employed by the BS, e.g., BS 110. As the details of the interleaving scheme are known to the UE, it can discern which REGs should be demodulated and decoded.

The control region is designed such that it is possible for the base-station to transmit control information messages to a specific UE as well as broadcast control information common to all the UEs in the cell. Control information broadcast across the entire cell is transmitted over a set of CCEs which are common to all the UEs. Each UE is also allocated, on a non-exclusive basis, a set of specific CCEs which can be used to carry dedicated control information messages. As the number of shared CCE resources in the control region is limited, it is possible and usual for CCEs to belong to multiple UE-specific sets. Broadcast control information messages can only be transmitted over the CCEs which are common to all the UEs. Dedicated control information messages can be transmitted using either the CCEs which are specific to the target UE or the common CCEs.

Figure 2B:
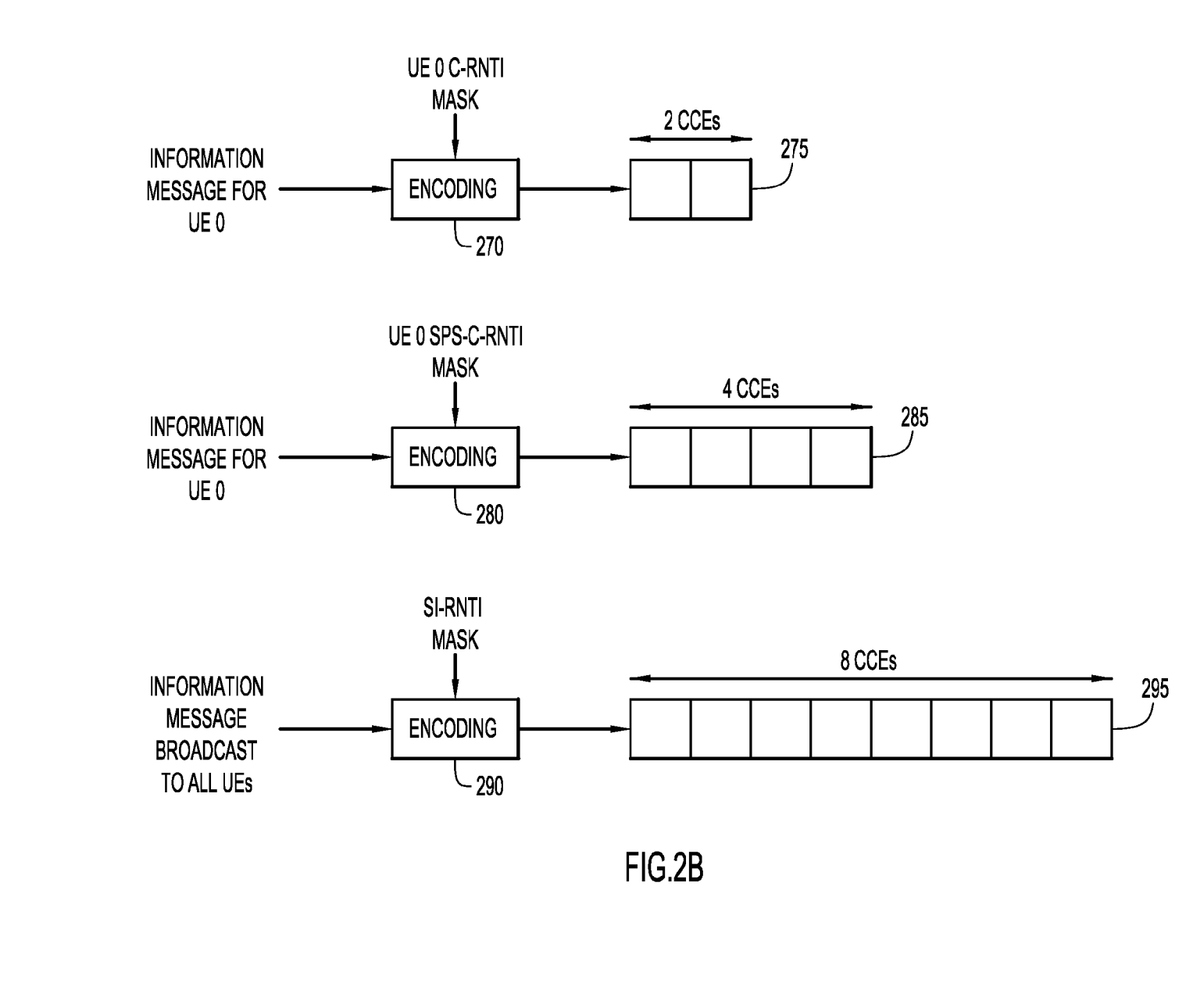
FIG. 2B is an example block diagram of control information encoding performed by a base station in order to generate CCEs.

FIG. 2B shows an example of how control information messages generated by the base-station in a given subframe are encoded. The first information message is intended for a specific UE, e.g., UE #0, and is encoded at 270 using first an outer CRC code and then an inner tail-biting convolutional code as described in 3GPP Technical Specification (TS) 36.212. A mask, referred to as C-RNTI in this case, is applied during the CRC encoding process. This mask is unique to the UE being targeted. As the CCEs in the control region are shared between the different UEs in the cell, such a mask is needed to identify the intended recipient of the message. The encoding of this first message is such that the coded version of the message utilizes 2 CCEs 275. At 280, a similar process takes place for the second information message transmitted to UE #0 over 4 CCEs 285. The number of CCEs over which the control information messages can be transmitted takes values from a pre-defined set specified in 3GPP TS36.213 and is known a priori by the UE. Control information messages which are transmitted over the set of CCEs common to all the UEs can use either 4 or 8 CCEs. The number of CCEs over which a control information message is transmitted is referred to as Aggregation Level (AL). Control information messages which are sent using a set of CCEs specific to a given UE can be coded with aggregation levels of 1, 2, 4 or 8.

It can also be seen that the second information message for UE #0 is using a mask different to that of the first message, namely SPS-C-RNTI mask. The mask which is applied during the encoding process not only identifies the target UE(s) but also identifies the message type. Finally, at 290, a broadcast control information message is encoded and transmitted over the control region. This message uses 8 CCEs 295 and a mask common to all the UEs is used during the encoding and denoted as SI-RNTI.

Figure 3:
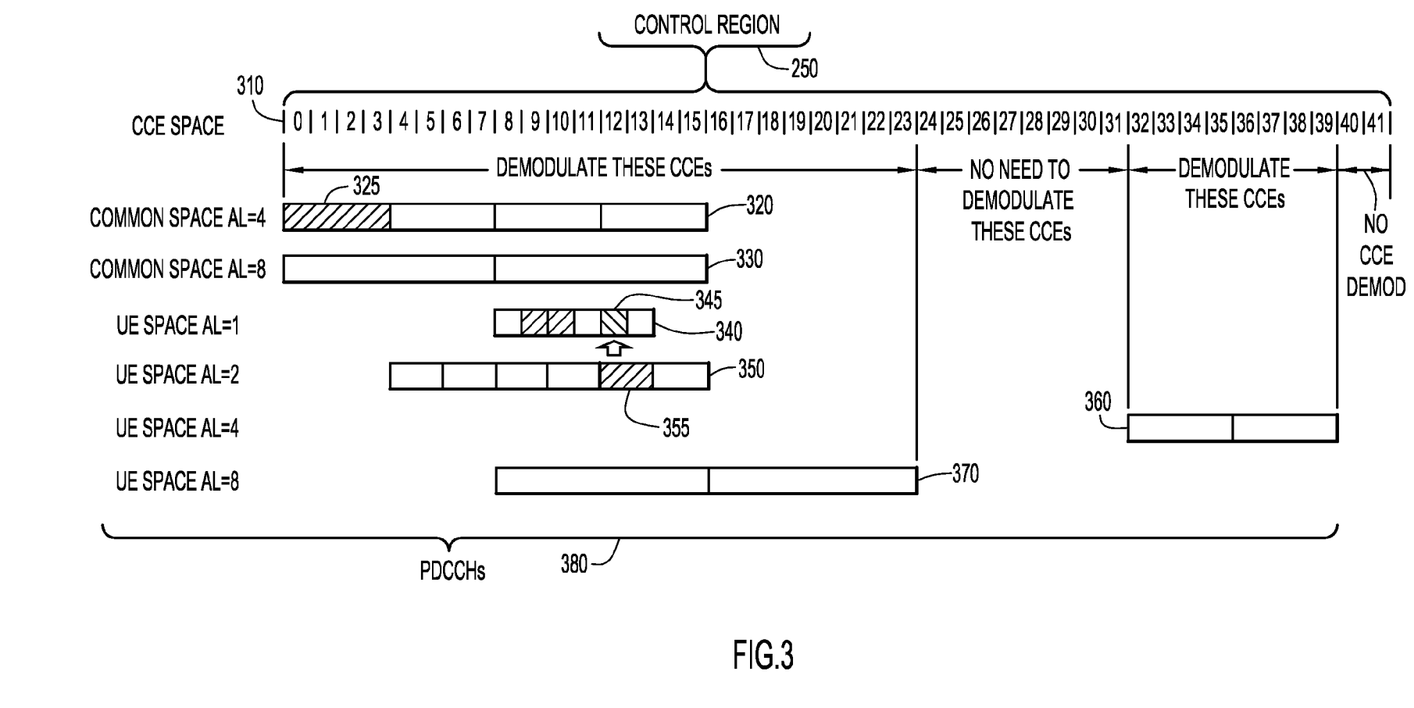
FIG. 3 is an example block diagram generally depicting one example of a distribution of selected CCEs that are to be demodulated according to the techniques described herein.

Referring to FIG. 3, the mapping between the control region 250 and the corresponding CCEs will now be described. The REGs in the control region 250 are de-interleaved and grouped into their respective CCEs 310. The three OFDM symbols in the control region 250 comprise 42 CCEs 310 (14 CCEs per symbol) numbered from 0 to 41. The CCEs 310 are generally searched to determine which CCEs are for the target UE and as such the CCEs form "search" spaces. The CCEs are grouped into search spaces that are defined by the aggregation level as well as whether these CCEs belong to the set common to all the UEs or to the set which is specific to the UE under consideration. The search spaces shown in FIG. 3 consist of two common search spaces 320 and 330, with aggregation levels 4 and 8 respectively, and four UE-specific search spaces 340, 350, 360, and 370, with aggregation levels 1, 2, 4 and 8 respectively. As they need to be received by all the UEs, the CCEs in the common search spaces are defined to be in fixed position at the beginning of the CCE space, i.e., CCEs 0 to 15. The location of the CCEs which belong to the UE-specific search spaces varies across the different subframes forming a radio frame and is specific to the UE under consideration.

The common search space 320 has an aggregation level of four indicating that four CCEs are aggregated while common search space 330 has an aggregation level of eight indicating that eight CCEs are aggregated, as shown by the spanning width of the various rectangles. Similarly, UE search spaces 340, 350, 360, and 370 have aggregation levels of one, two, four, and eight, respectively. The different search spaces define sets of CCEs which can be used by the base station to transmit control information to a given UE. At the UE side, the common and UE-specific spaces can be searched every subframe to determine which specific CCEs contain control information to be detected and decoded. The CCEs in the various aggregation levels that are for the target UE are indicated with hashing. The hashed areas indicate that four PDCCHs are intended for the target UE. By way of example, CCEs 325 in the common search space 320 and CCEs 355 in the aggregation level two UE search space 350 are for the target UE. The CCEs associated with the target UE are ultimately demodulated and decoded to derive the control information transmitted by the base station over the PDCCHs 380.

It can be seen from FIG. 3 that for each search space (common with AL=4, common with AL=8, UE-specific with AL=1, UE-specific with AL=2, UE-specific with AL=4, UE-specific with AL=8), a number of different CCE sets can be used by the base station to transmit the control information messages. By way of example, the CCE sets 370 with indices {8, 9, 10, 11, 12, 13, 14, 15} and {16, 17, 18, 19, 20, 21, 22, 23} are defined for the UE-specific search space with aggregation level 8. The CCE sets which can be used to convey control information to a UE can be referred equivalently as candidate CCE sets or PDCCH candidates. According to FIG. 3, 6 PDCCH candidates are defined in the common search spaces. Each UE-specific search space contains either 2 or 6 PDCCH candidates with a total of 16 candidates across the 4 separate spaces. Thus the UE needs to consider 22 PDCCH candidates across the common and UE-specific search spaces.

The base station does not explicitly signal the CCE location of the different control information messages transmitted in the control region of a given subframe. Hence, the UEs need to independently identify and decode any relevant control message. This process is referred to as blind decoding. The UE is implicitly informed of the size of the control region, i.e. one, two, three of four OFDM symbols and can derive the available CCE space from this information. Once the CCE space is known, it is possible for a UE to infer the location of the 22 PDCCH candidates. The UE then needs to test in turn each PDCCH candidate in order to detect the presence of a relevant control information message.

Each control information message in the common search space is transmitted using one of 2 possible sizes. Since the size of the individual control messages is not signaled by the base station, the UE needs to process the 6 PDCCH candidates in the common search space for both possible sizes. The processing of the 16 PDCCH candidates in the UE-specific search spaces also requires testing for 2 different possible sizes.

The UE needs not only to be able to receive and decode the control information messages transmitted by the base station but also to interpret the bit contents of the message. Further, since the control information messages can be used for the scheduling of different UE activities, different message types are defined. For example, one message type may be used to indicate that data needs to be retrieved in the data region of the subframe. Another message type may be used to schedule transmissions from the UE. Hence, the UE also needs to identify the types of the different control messages which are received. This is performed by testing each PDCCH candidate against the different possible message types. Messages types are typically identified by the mask applied during the CRC coding process. In some cases, bits contained in the message can be used to distinguish between message types.

Taking into account the number of PDCCH candidates and the need to consider multiple message sizes and types, it will be clear that a large number of tests need to be performed in order to blindly detect the presence of valid control information messages. The computational complexity of receiving, demodulating and decoding the different PDCCH candidates for the different possible message sizes and types therefore places a significant burden on the UE processing. The large number of tests that need to be performed also increases the probability of the UE incorrectly identifying control messages. Such False Alarm (FA) events are extremely undesirable as they can, for example, lead to unwanted UE transmissions with a resulting rise in the interference level experienced in the cell. Techniques are presented herein to reduce the UE computational complexity of the control region processing and to improve the detection accuracy of the blind decoding.

In a typical implementation, the UE will process and demodulate all the REGs transmitted by the base station in the control region. Such an approach results in a high UE processing load and is inefficient as it generates unnecessary information.

Figure 4:
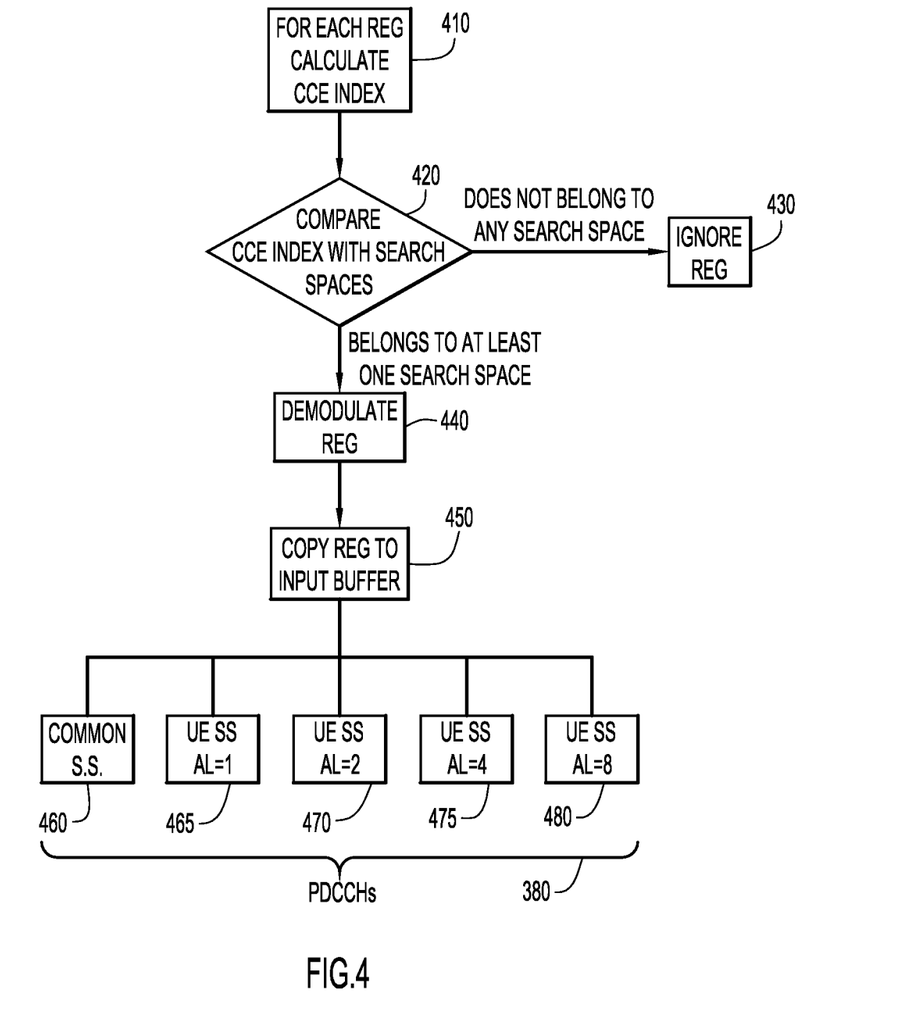
FIG. 4 depicts an example flowchart of a process for selecting resource element groups (REGs) that form CCEs for demodulation and storage according to the techniques described herein.

FIG. 4 describes an example solution where the computational complexity of the demodulation process is reduced. At 410, for each REG, calculate the index of the CCE it belongs to. This calculation is possible since the mapping applied by the base station between REGs and CCEs is deterministic and known at the UE. At 420, the index of the CCE to which this REG belongs is then compared to the different candidate CCE sets defined in the different search spaces. If the CCE index does not belong to any of the candidate CCE sets, at 430, the REG is ignored and the demodulation process for that REG can be skipped. Looking at FIG. 3 by way of example, it can be seen that any REG corresponding to CCE indices 24-31 can be ignored during the demodulation process.

If the CCE index associated with the REG being tested falls into at least one of the candidate CCE sets, at 440, the REG is demodulated. The information generated by the demodulation process takes the form of Log-likelihood Ratios (LLRs) calculated for each of the coded bits. A number of input buffers are then provided to store the results of this demodulation stage. Four separate input buffers 465, 470, 475, and 480 are provided for the UE-specific search spaces with aggregation levels 1, 2, 4 and 8, respectively. A single input buffer 460 is defined for the two common search spaces with aggregation levels 4 and 8 since they share the same set of CCEs, as shown in FIG. 3. The demodulated REG is copied to the relevant input buffers. Considering the example illustrated in FIG. 3, the REGs in CCE index 20 are copied to the input buffer corresponding to the UE-specific search space with aggregation level 8. It is also possible that multiple copies of the demodulated data are made to different input buffers. As an example, it can be seen that the REGs in CCE index 14 will be copied to the common search space input buffer as well as to the input buffers for the UE-specific search spaces with aggregation levels 2 and 8. The REGs in input buffers 460-480 correspond to the PDCCHs 380 as viewed in FIG. 3

Figure 5:
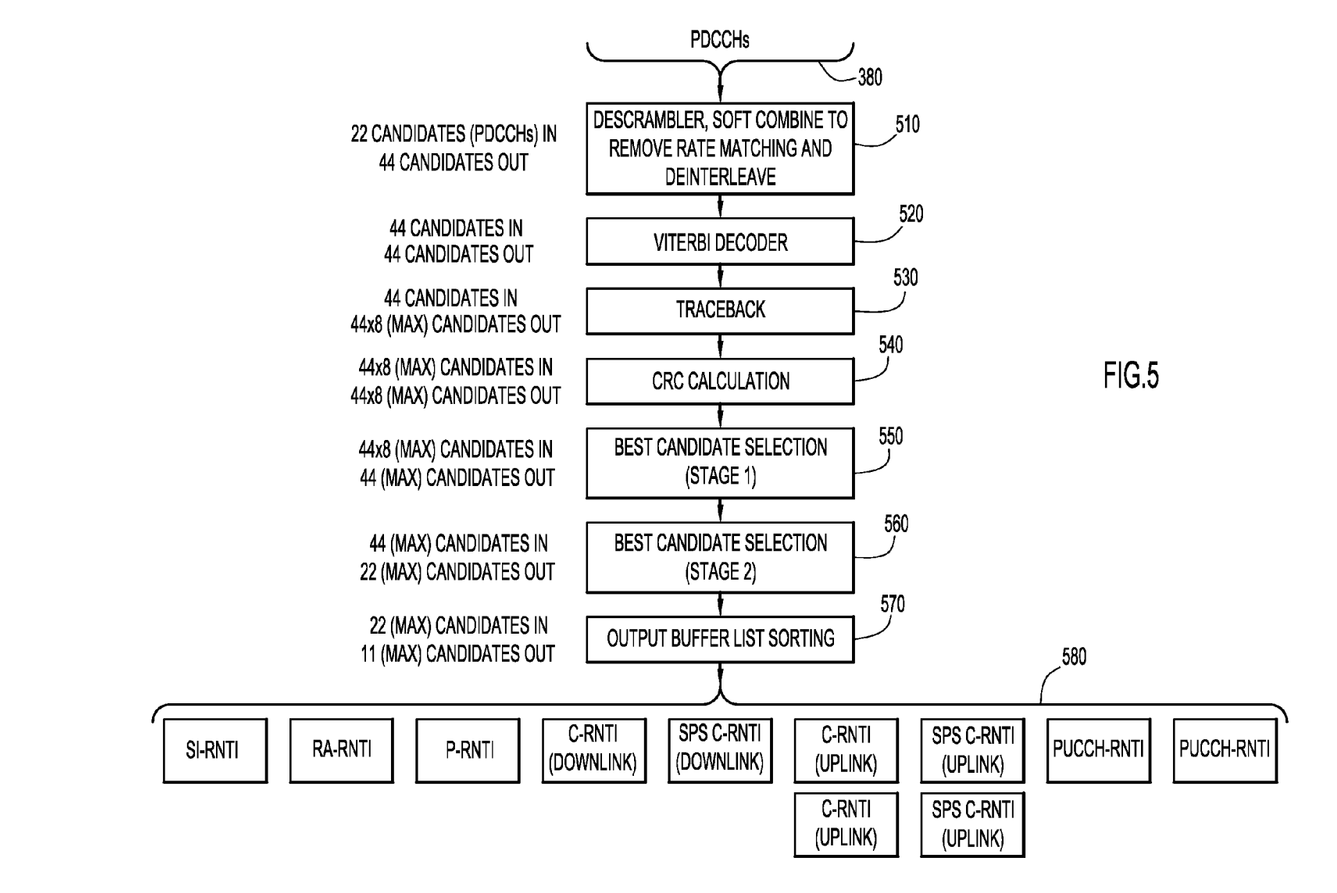
FIG. 5 is an example flow diagram generally depicting additional processing to be performed on demodulated CCEs according to the techniques described herein.

Turning now to FIG. 5, the processing of demodulated REGs is further described. At 510, each of the 22 PDCCH candidates is descrambled, soft combined, and de-interleaved. During this processing stage, the number of candidates increases by a factor of 2 as two different rate-matching configurations (two DCI sizes) are considered per PDCCH. A total of 44 candidates therefore need to be tested during the blind decoding. The soft combine stage handles the rate matching and may either increase or decrease the amount of data associated with each candidate by either inserting zeros or combining inputs together. At 520, each of the 44 decode candidates is processed by the Viterbi decoder. The output data may consist of a two dimensional (2D) map called a path history, as well as a table of 64 merge positions corresponding to one merge position per final state in the trellis, as used in LTE. The merge positions identify, on a per final state basis, the input positions which have the least reliable path history decision. The final path metrics from the Viterbi decoder are used to calculate QMs which are used for disambiguation during later processing.

At 530, trace-back is performed on the trellis. Trace-back for all 64 final trellis states is performed and the merge positions can be used to double the number of trace-back solutions being considered to 128. The list of 128 possible trace-backs is reduced to a list of up to 8 candidates which satisfy the tail-biting constraint (start and end trellis states are the same). The trace-back is performed for all 44 decode candidates, yielding at total 352 possible output candidates (44×8), as shown on the left side of each processing block in the figure.

It is possible to adapt the maximum number of selected candidates in order to control the computational complexity at the UE as well as the false alarm probability. For example, a lower maximum may be placed on the number of selected candidates when both common and UE-specific search spaces are processed compared to cases where the PDCCH candidates only need to be search in the common set of CCEs. As another example, the maximum number of candidates following trace-back processing can be made to vary with the number of message types that the UE needs to test for.

As a further mechanism to reduce the maximum UE computational complexity and the false alarm rate, it is also possible to ignore the information on the merge positions in conditions where the total number of tests to be performed by the UE across search spaces, DCI message size and message type for the blind decoding is high. This reduces the number of trace-back solutions being considered to 64 and also makes it possible to further limit the number of candidates which satisfy the tail-biting constraint and are considered for further processing.

At 540, CRC is performed according to embodiments described herein. During CRC, the number of candidates is reduced. The CRC calculation block first takes a list of up to nine RNTI masks (comprising SI-, RA-, P-, C-, Semi-persistent scheduling (SPS) C-, Physical Uplink Control Channel (PUCCH-), and Physical Uplink Shared Channel PUSCH-) and performs an efficient masked CRC check to determine which, if any, RNTI has been found. A maximum of eight parallel CRC checks are performed for each of the 44 PDCCH and message size candidates. The candidate messages are identified by the same CRC mask that is applied to the CRC bits during PDCCH generation at the base station. The receiver calculates expected CRC bits from the decoded message and applies these expected CRC bits to the decoded CRC bits through a bit-mask operation. The bits resulting from this masking operation will then correspond to the valid CRC masks (if present) and can be used to identify candidate messages. This approach provides a worthwhile reduction in the number of exclusive-OR (XOR) operations that are required during CRC checking.

Second, RNTI validity flags further specify which combinations of search space, DCI size, and CRC mask (RNTI) are allowed. RNTI Validity flags identify which possible combinations of: search space (Common or UE-specific), DCI size (Length 1, 2 or 3) and CRC mask (RNTI masks) are allowed, and which are not based on prior knowledge about the subframe. Tables 1 and 2 below identify the complete list of combinations which are possible for common and UE specific search spaces, respectively. An example of one RNTI validity flag could be based on the following parameters: search space=common, DCI length=1, and a matching C-RNTI.

DCI message formats come in differing lengths for formats 0, 1, 1A, 1B, 1C, 1D, 2, 2A, 3, and 3A. Table 1 illustrates common search space combinations:

TABLE 1

Common search space DCI combinations

| Length of message | Message format | Valid CRC masks |
|---|---|---|
| Length 1: DCI 0/1A/3/3A length | DCI 0 (first bit must be 0) | C-RNTI<br>C-RNTI^ = 0x1<br>SPS-C-RNTI<br>SPS-C-RNTI^ = 0x1 |
| | DCI 1A (first bit must be 1) | C-RNTI<br>SPS-C-RNTI<br>SI-RNTI<br>P-RNTI<br>RA-RNTI |
| | DCI 3, DCI 3A | TPC-PUSCH-RNTI<br>TPC-PUCCH-RNTI |
| Length 2: DCI 1C length | DCI 1C | SI-RNTI<br>P-RNTI<br>RA-RNTI |

Table 2 illustrates UE specific search space combinations:

TABLE 2

UE specific search space DCI combinations

| Length of message | Message format | Valid CRC masks |
|---|---|---|
| Length 1: DCI 0/1A/3/3A length | DCI 0 (first bit must be 0) | C-RNTI<br>C-RNTI ^ = 0x1<br>SPS-C-RNTI<br>SPS-C-RNTI ^ = 0x1 |
| | DCI 1A (first bit must be 1) | C-RNTI<br>SPS-C-RNTI |
| Length 3: DCI 1/1B/1D/2/2A length | DCI 1, DCI 1B, DCI 1D, DCI 2, DCI 2A | C-RNTI<br>SPS-C-RNTI |

Only those candidates that pass the CRC mask checks and that have RNTI validity flags are passed to the next processing stage, thereby further reducing the processing required at the next stage.

The RNTI validity flags may be set-up by the UE in each subframe based on knowledge of the message types that may be received in the given subframe. For example, in some subframes the UE will only be receiving messages of the type associated with the SI-RNTI mask. In these subframes, the UE can disable the RNTI validity flags corresponding to all the other message types. This will lead to a significant reduction in the processing performed by the UE as, for example, the UE-specific search space can be completely ignored.

The next two stages employ a "best" candidate screening process. At 550, the number of candidates is reduced by applying the constraint that each candidate CCE set in the CCE space can only produce one output, i.e., one PDCCH. In other words, a uniqueness constraint is applied which limits each set of CCEs forming a PDCCH to result in only one DCI being output. This constraint is used to prune down the number of candidates after CRC match using a Viterbi QM, or a combination of Viterbi QMs, calculated for each candidate to select only the best candidate from up to 16 candidates, i.e., the eight possible tail-biting solutions from trace-back and the two DCI sizes.

In one example, the Viterbi QM is a raw bit error indication obtained by re-encoding the DCI and counting incorrect bits that were not punctured during encoding.

In another example, the QM is a Viterbi metric that is computed for each of the candidate codewords during Viterbi forward processing, and this QM is used to select the best codeword. The QM can be calculated from the end path metrics (PMs) of the different states in the trellis. For example, $QM=(PM_{STATE}-PM_{MIN})/(PM_{MAX}-PM_{MIN})$, where $PM_{STATE}$ is the PM value for a given state in the trellis, $PM_{MAX}$ and $PM_{MIN}$ are maxima and minima in a given path.

Candidate codewords may be required to have a quality metric that meets or exceeds a pre-defined threshold. Alternatively, the quality metric can be used to rank the candidate codewords and select one or more output codewords based on this ranking.

Therefore, the up to 8 parallel candidates from the CRC check can be reduced to the one with the best QM, and only the quality numerator comparison is required, i.e., $(PM_{STATE}-PM_{MIN})$, as the denominator is common to all 8 candidates being compared.

At 560, the number of candidates is further reduced by applying the constraint that each CCE candidate set can only generate one output across the two possible DCI sizes, as described above. If both DCI sizes generated a match, then the one with the strongest QM is chosen. A full QM comparison is required using both the numerator and denominator since the denominator is not common to both DCI sizes.

At 570, output buffer sorting is performed. Note that it is possible for different valid messages to be received with the same format (see 3GPP TS 36.302 for a description of the different combinations of valid messages which can be received). The receiver may therefore contain a set of output buffers which are organized to contain the different valid messages. The number of output buffers is defined according to the worst-case combination of messages (PDCCHs) to be received (simultaneously or not). A Viterbi QM is associated with each message candidate held in the output buffers. When a new candidate message is considered for insertion in an output buffer, the QM may be used in order to decide whether a new message should be replacing an existing message already present in the corresponding output buffer. This approach can easily be extended to allow multiple Viterbi QMs to be stored with each message candidate in the output buffers. These different Viterbi QMs can then be combined when deciding whether a new message candidate should be stored in the relevant output buffer.

By organising the output buffers on a per RNTI-type basis, the amount of sorting required to insert a new candidate into an output buffer is minimized. This approach also provides detection performance benefits by limiting the number of message candidates considered for each message type to the maximum number that can be transmitted by the base-station. Doing so provides a reduction in the false alarm rate. It also reduces the risk of valid messages being missed when invalid messages overflow the output buffers. For DCI formats 0 and 1A, DCI bit zero is also used to select the correct output buffer as the value of bit zero is mutually exclusive for these formats.

Further, the RNTI-type detected during CRC is used to direct the candidate to the correct output buffer and to reduce sort complexity. Only one or two PDCCHs per RNTI-type can be sent by the eNode B, and this constraint is used to limit the number of elements in the output buffers to one or two. If the two candidates being compared have different DCI payload data, then the candidate selection is performed using the Viterbi quality metrics. At 580, most output buffers contain a maximum of one RNTI on a per RNTI-type basis, while the output buffers for the C-RNTI (uplink) and SPS-RNTI (uplink) can contain two RNTIs, as shown.

In certain conditions, it is possible that a single control information message sent by the base station is detected twice at the UE. Such an occurrence is referred to by the term of "aliasing" as used in the signal processing context. An alias example is shown in FIG. 3 where PDCCH 355 transmitted in the UE-specific search space with aggregation level 2 is also detected in the CCE candidate set 345 in the UE-specific search space with aggregation level 1. Such an alias corresponding to multiple detections at the UE of the same control information message is highly undesirable. If the alias versions of the control information message are interpreted by the UE as valid PDCCHs, then the UE will implement invalid scheduling decisions which could, for example, lead to undesired transmissions. Aliasing could also lead to valid messages being missed by the UE. It is important to note that two C-RNTI (uplink) and SPS-RNTI (uplink) messages may be transmitted by the base station and hence the associated output buffers have a depth of two. It is therefore important to detect and to discard duplicate DCIs that could otherwise "clog up" the two-element output buffers and mask a different but genuine candidate.

In order to detect an alias, the data contents of each of a new candidate DCI is compared to that of the messages already stored in the output buffer where the new DCI would be inserted. If the DCI data is found to be identical to that of any of the stored messages, an alias is detected. When an alias is detected, the UE needs to decide whether to replace the existing stored message in the output buffer with the new candidate or to discard the new candidate. This decision can be made by comparing quality metrics associated with the stored message and the new candidate message. In one embodiment of the invention, the quality metric used in the comparison is the aggregation level of the DCIs and the DCI with the highest aggregation level is selected. In an alternative embodiment, the selection is performed using the Viterbi QM, or a combination of Viterbi QMs when multiple metrics are calculated. The quality metric used in the comparison can also be derived from a combination of aggregation level and Viterbi QM in order to handle the cases where the two DCIs are coming from the same search space and have the same aggregation level. It may be desirable to sort the contents of the output buffer when the new candidate is used to replace the stored message.

It is possible to refine the alias detection step by not only comparing the data contents of the DCIs being considered but also taking into account the indices of the corresponding CCE candidate sets. For example, an alias could be declared when the data contents of the two DCIs are identical and the two CCE candidate sets overlap, either entirely or partially.

Figure 6:
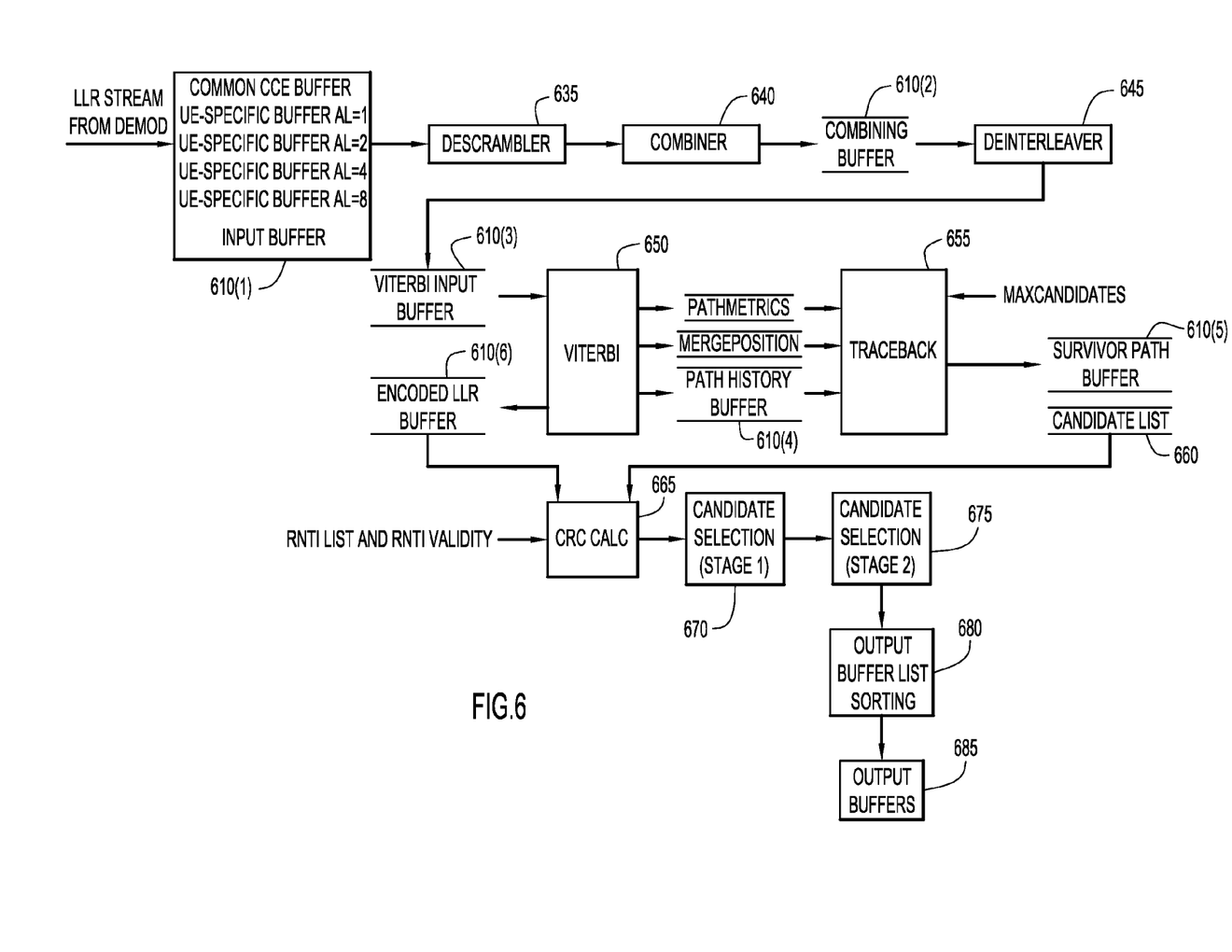
FIG. 6 is an example hardware diagram generally depicting components used for additional processing to be performed on demodulated CCEs according to the techniques described herein.

Referring to FIG. 6, a pseudo-hardware block diagram for a UE is shown that illustrates functions performed in hardware and/or in software that correspond to the various elements described in connection the previous figures after demodulation. As viewed from the left of the figure, an LLR stream is received from the demodulator and the LLR data are fed into corresponding buffers of input buffer 610(1). The buffer in Input buffer 610(1) correspond to input buffers 460-480 as viewed in FIG. 4.

Corresponding input buffer data are fed to descrambler 635, then to combiner 640, and subsequently to de-interleaver 645 via combining buffer 610(2), substantially as described above. De-interleaved data are stored in Viterbi input buffer 610(3) for subsequent decoding by Viterbi decoder 650. Viterbi decoder 650 generates path metrics, merge positions, and a path history that is stored on path history buffer 610(4). The data generated by Viterbi decoder 650 are fed to trace-back module 655 which also uses a maximum number of candidates value from register configuration FIFO 625. The output of trace-back module 655 is stored in survivor path buffer 610(5) and from which a candidate list 660 is generated.

The candidate list 660 is fed to CRC calculation module 665, along with numerous other inputs as shown. The CRC calculation module 665 outputs candidates to candidate selection stage 1, at 670, then to candidate selection stage 2, at 675, and to output buffer list sorting, at 680, as described in connection with FIG. 4. The RNTIs used by the target UE loaded into output buffers 685.

Figure 7:
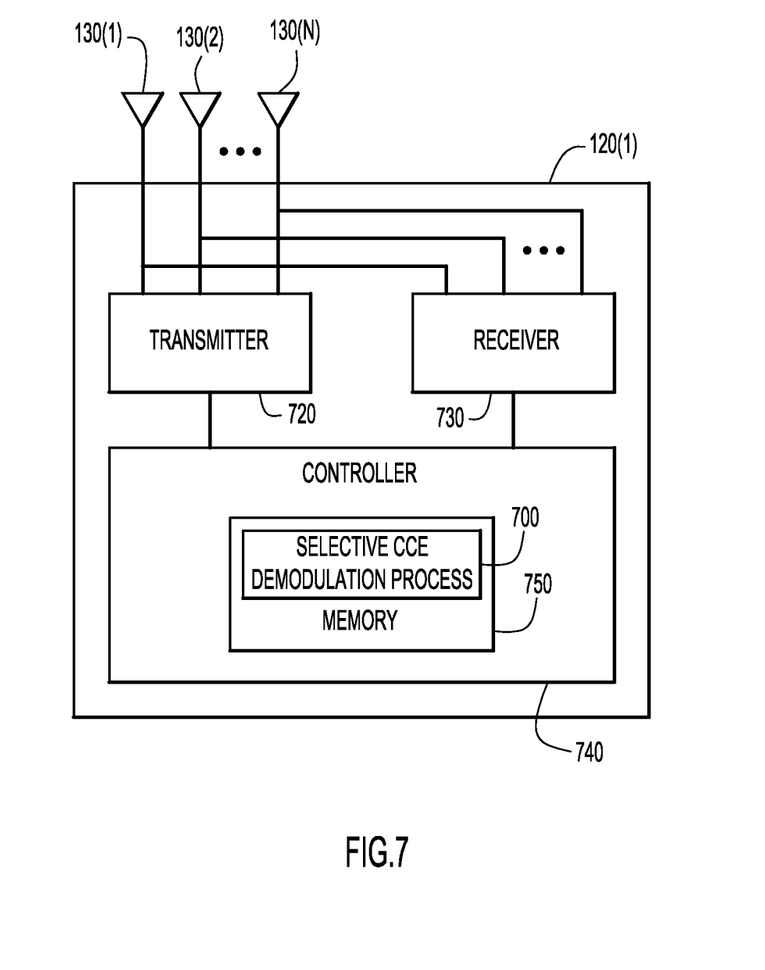
FIG. 7 is an example block diagram of a UE that implements the selective CCE demodulation process according to the techniques described herein.

Turning now to FIG. 7, an example block diagram is shown of a wireless communication device that may serve as MS 120(1) from FIG. 1 for the purpose of describing the selective CCE demodulation process techniques described above. FIG. 7 depicts MS 120(1) as an example of a wireless communication device that is configured to perform the selective CCE demodulation process labeled with reference numeral 800. The wireless communication device MS 120(1) comprises a transmitter 720, a receiver 730, and a controller 740. The controller 740 supplies the data to the transmitter 720 to be transmitted and processes signals received by the receiver 730. In addition, the controller 740 performs other transmit and receive control functionality. Part of the functions of the transmitter 720 and receiver 730 may be implemented in a modem and other parts of the transmitter 720 and receiver 730 may be implemented in radio transmitter and radio transceiver circuits. It should be understood that there are analog-to-digital converters (ADCs) and digital-to-analog converters (DACs) in the various signal paths to convert between analog and digital signals.

The transmitter 720 may comprise individual transmitter circuits that supply respective upconverted signals to corresponding ones of a plurality of antennas 130(1)-130(N) for transmission. The receiver 730 comprises a detector for detecting the signals received at each of the antennas 130(1)-130(N) and supplies corresponding detected data, e.g., LLR data, to the controller 740. It is understood that the receiver 730 may comprise a plurality of receiver circuits, each for a corresponding one of a plurality of antennas 130(1)-130(N). For simplicity, these individual receiver circuits are not shown. The controller 740 comprises a memory 750 or other data storage block that stores data used for the techniques described herein. The memory 750 may be separate or part of the controller 740. Instructions for performing the selective CCE demodulation process 800 may be stored in the memory 750 for execution by the controller 740.

The functions of the controller 740 may be implemented by logic encoded in one or more tangible (non-transitory) media (e.g., embedded logic such as an application specific integrated circuit, digital signal processor instructions, software that is executed by a processor, etc.), wherein the memory 750 stores data used for the computations described herein (and/or to store software or processor instructions that are executed to carry out the computations described herein). Thus, the process 800 may be implemented with fixed logic or programmable logic (e.g., software/computer instructions executed by a processor).

Figure 8:
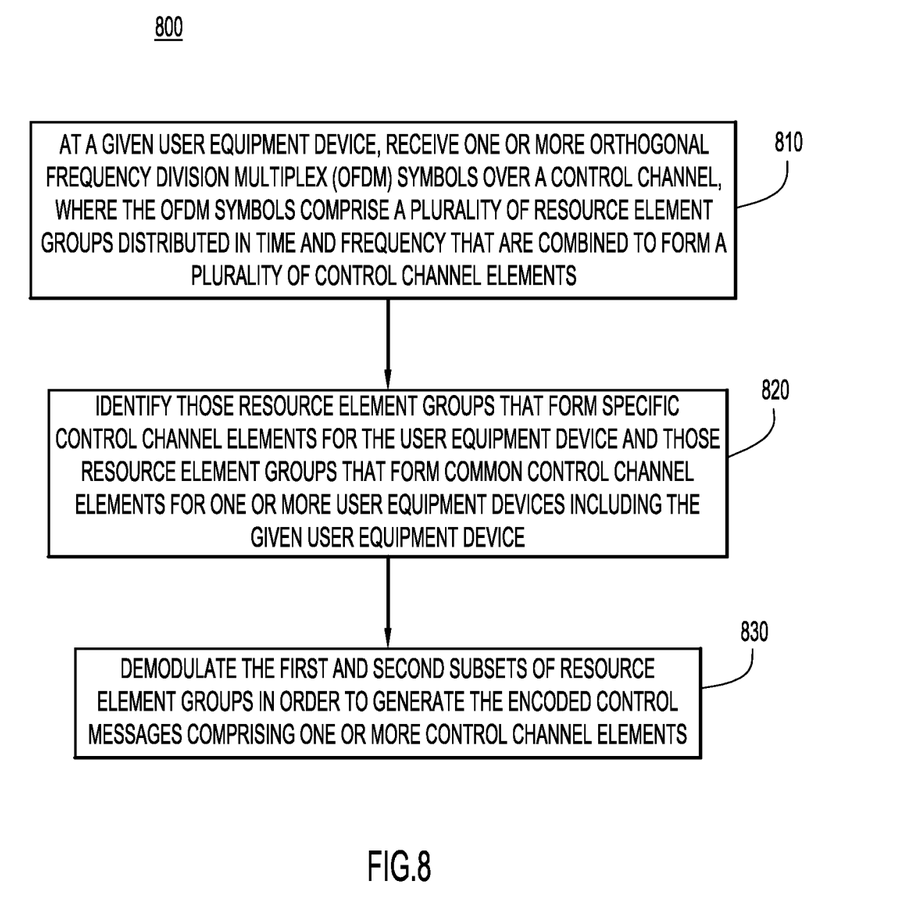
FIG. 8 depicts an example flowchart of the selective CCE demodulation process according to the techniques described herein.

Referring to FIG. 8, the selective CCE demodulation process 800 will now be described. At 810, for a given user equipment device, one or more of OFDM symbols are received over a control channel, where the OFDM symbols comprise a plurality of resource element groups distributed in time and frequency that are combined to form control channel elements. At 820, those resource element groups that form specific control channel elements for the user equipment device and those resource element groups that form common control channel elements for one or more user equipment devices including the given user equipment device are identified. At 830, the resource element groups that form the specific control channel elements and the resource element groups that form the common control channel elements are demodulated to generate encoded control messages comprising one or more control channel elements.

Techniques provided herein further include calculating for each resource element group an index to a corresponding control channel element based on an indexing scheme employed at a base station configured to transmit the one or more of OFDM symbols, and where identifying whether or not the index corresponds to one of the specific control channel elements or one of the common control channel elements.

Encoded control messages comprising common control channel elements may be stored in a common input buffer while encoded control messages comprising one or more UE specific control channel elements may be stored in specific input buffers corresponding to a number of specific control channel elements within the respective encoded control message.

Decoding, e.g., Viterbi decoding, is performed on the encoded control messages to generate candidate codewords. One or more of the candidate codewords are identified as one or more valid codewords when the one or more candidate codewords pass a cyclic redundancy check condition. The one or more valid codewords may be identified by performing the cyclic redundancy check using bit masks corresponding to known control message types. The one or more valid codewords may be filtered based on a combination of a control message validity flag, known control message sizes, and bit masks corresponding to known control message types.

At least one quality metric may be computed for each of the valid codewords, and the one or more valid codewords may be selected based on the quality metrics. The valid codewords may also comprise a control message type that is scheduled for transmission once per subframe, and when two or more of the valid codewords of the same control message type are decoded, one of the valid codewords is selected using one or more of a valid codeword with a higher quality metric and a valid codeword associated with a higher aggregation level.

The valid codewords may comprise a control message type that is scheduled for transmission more than once per subframe, and when two or more of the valid codewords of the same control message type are decoded, a subsequently decoded valid codeword is compared with a previously decoded valid codeword of the same control message type to determine if the same control message is received. When the same control message is received in the previous and subsequent decoded messages, a valid codeword is selected using one or more of a valid codeword with higher quality metric and a valid codeword associated with a higher aggregation level.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A demodulation method for encoded control messages, comprising:
    at a given user equipment device, receiving one or more Orthogonal Frequency Division Multiplex (OFDM) symbols over a control channel, wherein the OFDM symbols comprise a plurality of resource element groups distributed in time and frequency that are combined to form a plurality of control channel elements;
    calculating for each resource element group an index to a corresponding control channel element based on an indexing scheme employed at a base station configured to transmit the one or more of OFDM symbols;
    identifying a first subset of resource element groups and a second subset of resource element groups from among the plurality of resource element groups based on the calculated resource element group indices, wherein the first subset is used to form specific control channel elements for the given user equipment device and the second subset is used to form common control channel elements for one or more user equipment devices including the given user equipment device;
    discarding resource element groups that are not identified in the first and second subsets of resource element groups; and
    demodulating the first and second subsets of resource element groups in order to generate the encoded control messages comprising one or more control channel elements.

2. The demodulation method of claim 1, further comprising:
    storing encoded control messages comprising common control channel elements in a common input buffer; and
    storing encoded control messages comprising one or more user equipment specific control channel elements in specific input buffers corresponding to an aggregation level of a respective encoded control message.

3. The demodulation method of claim 1, further comprising a decoding method, comprising:
    decoding the encoded control messages to generate candidate codewords; and
    identifying one or more of the candidate codewords as one or more valid codewords when the one or more candidate codewords pass a cyclic redundancy check condition.

4. The demodulation method of claim 3, wherein identifying the one or more valid codewords comprises performing the cyclic redundancy check using bit masks corresponding to known control message types.

5. The demodulation method of claim 3, further comprising filtering the one or more valid codewords based on a combination of a control message validity flag, known control message sizes, and bit masks corresponding to known control message types.

6. The demodulation method of claim 3, further comprising:
    computing at least one quality metric for each of the valid codewords; and
    wherein identifying comprises selecting the one or more valid codewords based on the quality metrics.

7. The demodulation method of claim 3, wherein when a valid codeword comprises a control message type that is scheduled for transmission once per subframe, and wherein when two or more of the valid codewords of the same control message type are decoded, identifying further comprises selecting one or more of a valid codeword with a higher quality metric.

8. The demodulation method of claim 3, wherein when a valid codeword comprises a control message type that is scheduled for transmission more than once per subframe, and wherein when two or more of the valid codewords of the same control message type are decoded, and further comprising:
    comparing a subsequently decoded valid codeword with a previously decoded valid codeword of the same control message type to determine if the same control message is received; and
    wherein when the same control message is received, identifying further comprises selecting one or more of a valid codeword with a higher quality metric.

9. The demodulation and decoding method of claim 3, further comprising:
    filtering two or more valid codewords comprising a same control message type based on quality metrics.

10. The demodulation method of claim 9, further comprising:
    storing the valid codewords with higher quality metrics in different output buffers corresponding to a control message type of the valid codewords.

11. A communication apparatus comprising a receiver and a processor, the apparatus configured to:
    receive one or more Orthogonal Frequency Division Multiplex (OFDM) symbols over a control channel, wherein the OFDM symbols comprise a plurality of resource element groups distributed in time and frequency that are combined to form a plurality of control channel elements;

calculate for each resource element group an index to a corresponding control channel element based on an indexing scheme employed at a base station configured to transmit the one or more of OFDM symbols;

identify a first subset of resource element groups and a second subset of resource element groups from among the plurality of resource element groups based on the calculated resource element group indices, wherein the first subset is used to form specific control channel elements for the apparatus and the second subset is used to form common control channel elements for the apparatus and for one or more other apparatus adapted to receive the OFDM symbols over the control channel;

discard resource element groups that are not identified in the first and second subsets of resource element groups; and demodulate the first and second subsets of resource element groups in order to generate the encoded control messages comprising one or more control channel elements.

12. The communication apparatus of claim 11, wherein the processor is further configured to:

store encoded control messages comprising common control channel elements in a common input buffer; and store encoded control messages comprising one or more user equipment specific control channel elements in specific input buffers corresponding to an aggregation level of a respective encoded control message.

13. The communication apparatus of claim 11, wherein the processor configured to:

decode the encoded control messages to generate candidate codewords; and identify one or more of the candidate codewords as one or more valid codewords when the one or more candidate codewords pass a cyclic redundancy check condition.

14. The communication apparatus of claim 13, wherein the processor is configured to identify the one or more valid codewords by performing the cyclic redundancy check using bit masks corresponding to known control message types.

15. The communication apparatus of claim 13, wherein the processor is further configured to comprising filter the one or more valid codewords based on a combination of a control message validity flag, known control message sizes, and bit masks corresponding to known control message types.

16. The communication apparatus of claim 13, wherein the processor is further configured to:

compute at least one quality metric for each of the valid codewords; and select the one or more valid codewords based on the quality metrics.

17. The communication apparatus of claim 13, wherein when a valid codeword comprises a control message type that is scheduled for transmission once per subframe, and when two or more of the valid codewords of the same control message type are decoded, the processor is configured to select one or more of a valid codeword with a higher quality metric and a valid codeword associated with a higher aggregation level.

18. The communication apparatus of claim 13, wherein when a valid codeword comprises a control message type that is scheduled for transmission more than once per subframe, and when two or more of the valid codewords of the same control message type are decoded, the processor is further configured to:

compare a subsequently decoded valid codeword with a previously decoded valid codeword of the same control message type to determine if the same control message is received; and wherein when the same control message is received, select one or more of a valid codeword with a higher quality metric and a valid codeword associated with a higher aggregation level.

19. The communication apparatus of claim 13, wherein the processor is further configured to:

filter two or more valid codewords comprising a same control message type based on quality metrics.

20. The communication apparatus of claim 13, wherein the processor is further configured to:

store the valid codewords with higher quality metrics in different output buffers corresponding to a control message type of the valid codewords.

* * * * *